United States Patent [19]

Gordon

[11] Patent Number: 5,222,588

[45] Date of Patent: Jun. 29, 1993

[54] SECONDARY CONVEYOR BELT CLEANERS

[75] Inventor: James R. Gordon, Benton, Ill.

[73] Assignee: Gordon Belt Scrapers, Inc., Benton, Ill.

[21] Appl. No.: 877,229

[22] Filed: May 1, 1992

Related U.S. Application Data

[63] Continuation-in-part of Ser. No. 647,149, Jan. 29, 1991.

[51] Int. Cl.⁵ .............................................. B65G 45/12
[52] U.S. Cl. .................................... 198/499; 198/497
[58] Field of Search ................................ 198/497, 499

[56] References Cited

U.S. PATENT DOCUMENTS

| | | | |
|---|---|---|---|
| 3,811,557 | 5/1974 | Hartwig | 198/497 |
| 3,913,728 | 10/1975 | Pott | 198/497 |
| 3,998,322 | 12/1976 | McBride | 198/497 |
| 4,131,194 | 12/1978 | Andersson | 198/497 |
| 4,202,437 | 5/1980 | Gordon | 198/497 |
| 4,257,517 | 3/1981 | MacPherson et al. | 198/497 |
| 4,269,301 | 5/1981 | Gibbs | 198/499 |
| 4,349,098 | 9/1982 | Veenhof | 198/497 |
| 4,489,823 | 12/1984 | Gordon | 198/499 |
| 4,533,036 | 8/1985 | Gordon | 198/499 |
| 4,598,823 | 7/1986 | Swinderman | 198/497 |
| 4,643,293 | 2/1987 | Swinderman | 198/497 |
| 4,658,949 | 4/1987 | Reicks | 198/497 |
| 4,787,500 | 11/1988 | Holz | 198/497 |
| 4,825,996 | 5/1989 | Davids | 198/497 |
| 4,838,409 | 6/1989 | Rappen | 198/497 |
| 4,854,443 | 8/1989 | Gordon | 198/497 |
| 4,917,231 | 4/1990 | Swinderman | 198/497 |
| 4,953,689 | 9/1990 | Peterson et al. | 198/497 |
| 4,962,845 | 10/1990 | Gibbs | 198/499 |
| 5,011,002 | 4/1991 | Gibbs | 198/497 |
| 5,016,746 | 5/1991 | Gibbs | 198/497 X |

FOREIGN PATENT DOCUMENTS

| | | | |
|---|---|---|---|
| 0328171 | 8/1989 | European Pat. Off. | 198/499 |
| 1342834 | 10/1987 | U.S.S.R. | 198/497 |
| 1515061 | 6/1978 | United Kingdom | 198/497 |
| 2012234 | 7/1989 | United Kingdom | 198/497 |
| 2221440 | 2/1990 | United Kingdom | 198/497 |

Primary Examiner—Robert P. Olszewski
Assistant Examiner—James R. Bidwell
Attorney, Agent, or Firm—Kinzer, Plyer, Dorn, McEachran & Jambor

[57] ABSTRACT

A secondary conveyor belt cleaner includes a metal support of length L1 and a metal guide of continuous or intermittent construction; the support extends across a conveyor belt of width W in spaced relation to the belt. A plurality of belt cleaner blades of total length L2 ($W \approx L1 \approx L2$) are mounted on the guide by a plurality of metal cantilever support arms, usually forged aluminum, one per blade; on each arm there is a metal reinforcement that fits snugly in a base wall in its blade. Torsion bias acting on the support rotationally urges the blades against the conveyor belt.

22 Claims, 4 Drawing Sheets

SECONDARY CONVEYOR BELT CLEANERS

PRIOR APPLICATION

This application is a continuation-in-part of application Ser. No. 647,149 filed Jan. 29, 1991.

BACKGROUND OF THE INVENTION

Multi-blade cleaners are frequently used with belt conveyors in mining and mineral storage operations and other such applications; a multi-blade device is often used as a secondary cleaner that scrapes the return run of the conveyor belt to remove material that would otherwise adhere to its surface. Secondary cleaners usually supplement a single-blade or multi-blade cleaner that scrapes material from a part of the conveyor belt backed up by the head pulley. Conveyor belt cleaners, primary and secondary, usually operate in an environment that can only be described as hostile. The working conditions are frequently wet, dirty, and even corrosive. Continuing maintenance activity is a necessity due to inevitable wear on the cleaner blades, but is often rendered difficult by limited access space as well as the aforementioned adverse working conditions. In excessively wet or corrosive environments, maintenance is made more difficult by corrosion of metal mounting bolts, clamps, and the like. All of these difficulties are likely to be present in mining operations and also in industrial applications.

A secondary cleaner for a belt conveyor is likely to encounter substantial problems from shock forces applied to the cleaner blades. When large pieces of the conveyed material or debris, clinging to the conveyor belt, engage a cleaner blade, they may stress the blade or its support severely. The cleaner blades are also subject to impact damage from repeated engagement with joints between individual segments of the conveyor belt. Repeated shocks and impacts of this kind may lead to shutdown for repair or replacement of belt cleaner components, a time consuming and expensive procedure. Thus, it is important to minimize or avoid shock damage to the components of a secondary conveyor belt cleaner as well as to compensate for the inevitable wear on the belt cleaner blades due to continuing normal operation. Multi-blade cleaners are often preferred, in secondary cleaners because a multi-blade construction limits many stresses to only one blade of several, but an elongated continuous blade may sometimes be used in a secondary cleaner.

Effective and efficient conveyor belt cleaners that utilize a torsion bias mechanism to maintain the cleaner blades in engagement with the conveyor belt are disclosed in U.S. Pat. No. 4,533,036 issued to James R. Gordon Aug. 6, 1985. Both primary and secondary belt scrapers are disclosed. Those conveyor belt cleaners, however, have the disadvantage that replacement of individual cleaner blades or blade support arms may require appreciable down-time because the blades or their supports are keyed to the torsion biased shaft. The blade support arms utilized in the secondary cleaners shown in that patent may be made of inexpensive steel rod with molded resin joints; such steel rods may be undesirable, in wet and corrosive environments, due to excessive corrosion.

Other secondary conveyor belt cleaner arrangements are described in two United States patents to R. T. Swinderman, U.S. Pat. No. 4,643,293 issued Feb. 17, 1987 and U.S. Pat. No. 4,917,231 issued Apr. 17, 1990. In those two patents support arms molded of resilient resins such as polyurethane are employed in secondary type belt cleaners. Because the support arms are made entirely of resilient molded resin, they are not unduly prone to corrosion. In the later U.S. Pat. No. 4,917,231, the disclosed blades are designed to maintain a constant "cleaning angle" at the blade/belt interface despite blade wear. These blade support arms of resilient material must be made large enough to withstand belt pressure and torsion forces; stiff support arms (e.g. metal) can be thinner so that there is less material buildup on the arms.

Other secondary belt cleaners are disclosed in Gordon U.S. Pat. No. 4,854,443, issued Aug. 8, 1989. Each conveyor belt cleaner disclosed in that patent has cantilever blade support arms that utilize a keyed interference fit for a firm but displaceable mounting of the fixed end of the arm on a support. That patent provides internal reinforcements in either or both ends of each blade support arm, affording a marked improvement in durability.

One problem with secondary belt cleaners that has not received adequate recognition derives from the use of unduly flexible, resilient support arms. Some limited resilience in a secondary belt cleaner is necessary to accommodate belt joints and heavy, clinging, localized accumulations on the belts. But if each blade is readily displaceable independently of the others, as is often the case in prior constructions, undue displacement and vibration may reduce efficiency undesirably.

SUMMARY OF THE INVENTION

It is an object of the invention to provide new and improved constructions for secondary conveyor belt cleaners that effectively eliminate or minimize problems discussed above while providing for extended operating life in a belt cleaner of minimum cost.

Another object of the invention is to provide a new and improved secondary cleaner construction for a conveyor belt cleaner, suitable for use in mining and in heavy duty industrial applications, that provides for rapid and convenient replacement of scraper blades and individual blade support arms, and that affords improved shock protection and durability for the cleaner blades, support arms, and conveyor belt, in a construction that is simple, inexpensive, and highly durable. In this aspect, the invention is predicated, to a substantial extent, on the realization that attempts to relieve shock forces through the use of longitudinally or torsionally resilient support arms in secondary belt cleaners can be self-defeating and that markedly improved durability can be obtained with stiff support arms in a cleaner apparatus that provides operational resilience only in regard to other cleaner blade supports.

Accordingly, the invention relates to a cantilever blade support arm for a secondary conveyor belt cleaner, for supporting a blade unit of the kind comprising a flexible blade of molded resin having, in cross section, a short base wall and two longer side walls extending away from opposite sides of the base wall and converging at an elongated belt scraping edge, and a blade mounting member for mounting the blade on a cantilever blade support, the mounting member including one element of two complementary plug-and-socket connection elements. The cantilever blade support arm comprises an elongated, stiff, unitary support arm, preferably an aluminum forging, having an inner anchor end and an outer blade support end. A plurality of mounting receptacles, each defined by two longitudinally displaced spaced projections at the inner end of the arm, are provided for mounting the arm on a transverse support member in a secondary conveyor belt cleaner; the receptacles are displaced longitudinally from each other along the arm so that the support arm has any one of a corresponding plurality of effective arm lengths. Preferably, there are plural mounting receptacles so that the support arm has any one of a corresponding plurality of effective arm lengths. A plug-and-socket element is provided at the outer end of the arm, complementary to the plug-and-socket element of the blade mounting member, for mounting the blade mounting member on the arm.

DESCRIPTION OF THE PREFERRED EMBODIMENT

Figure 1:
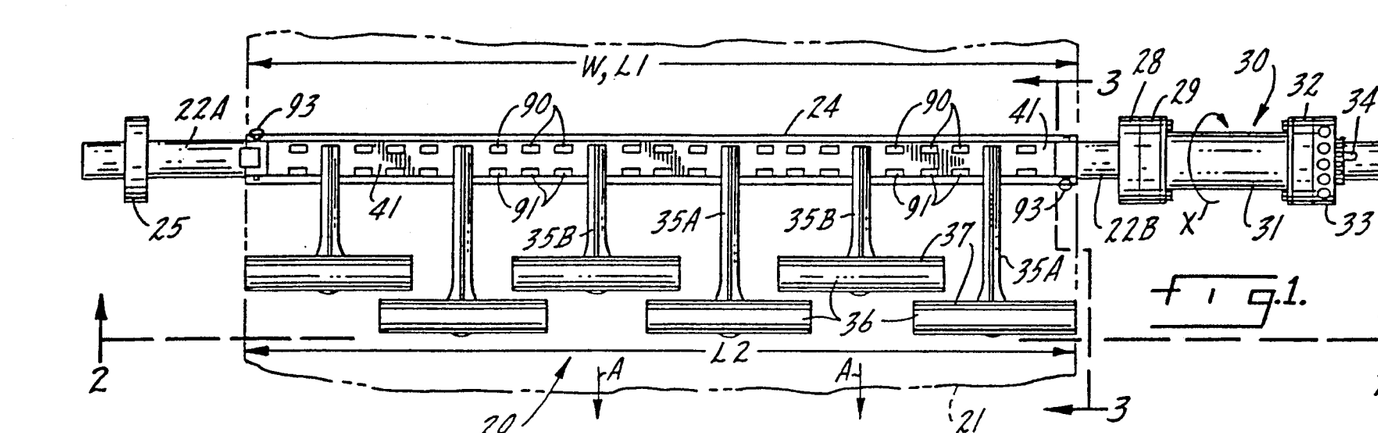
FIG. 1 is a plan view of a secondary conveyor belt cleaner constructed in accordance with one embodiment of the invention.
Figure 2:
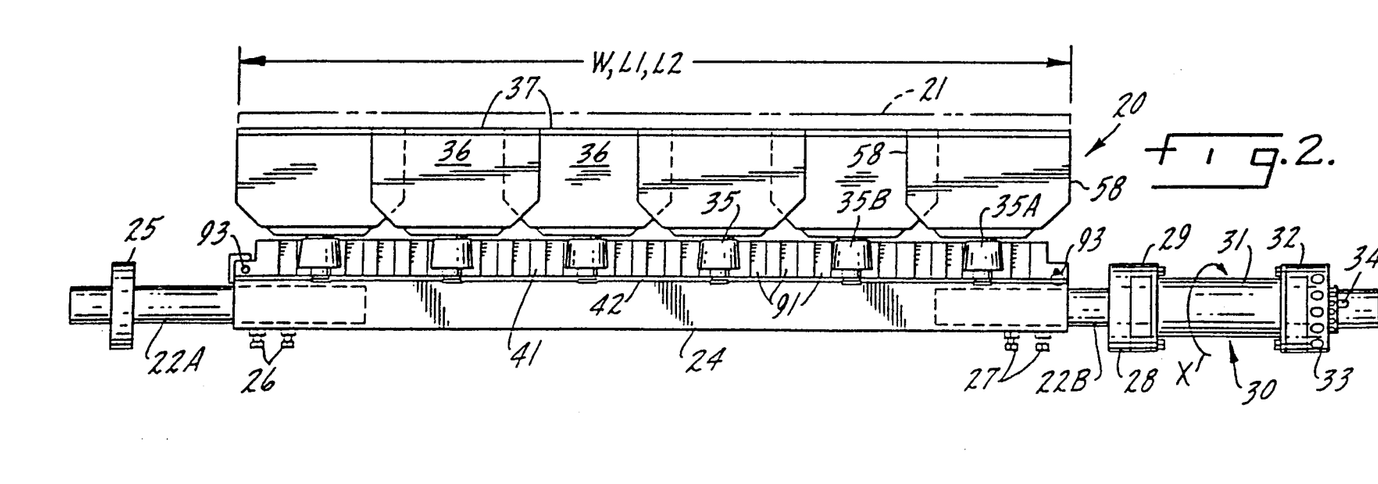
FIG. 2 is a front elevation view taken approximately as indicated by line 2—2 in FIG. 1.

FIGS. 1 and 2 illustrate a secondary conveyor belt cleaner 20 for cleaning a conveyor belt 21 of width W. Belt 21 moves in the direction of arrows A, FIGS. 1 and 3. Belt cleaner 20 comprises two elongated shafts 22A and 22B that are aligned with each other and that are joined by an elongated support member 24, a rigid metal sleeve that extends transversely of belt 21 in spaced relation to the lower surface of the belt, the surface to be cleaned. Support member 24 has a length L1 approximately equal to belt width W; in the drawings they are shown equal. The left-hand end of shaft 22A, FIGS. 1 and 2, is journalled in a bearing 25 supported by a fixed frame (not shown). Inwardly from bearing 25, shaft 22A is affixed to the elongated sleeve or support member 24 by suitable means such as a plurality of screws 26 (FIG. 2). Similar mounting screws 27 join the other end of the tubular support member 24 to shaft 22B. If desired, the shaft segments 22A, 22B may be a continuous shaft through the interior of sleeve 24 or components 22A, 22B and 24 may be all one integral member.

The right-hand portion of shaft 22B, FIGS. 1 and 2, extends through another bearing 28 mounted in the fixed frame (not shown) that affords general support for the secondary conveyor cleaner 20. Bearing 28 is connected to a flange or collar 29 on a torsion tube 31 that is part of a torsion bias mechanism 30. Another flange or collar 32 on the other end of torsion tube 31 is connected to a collar 33. Collar 33 is connectable to the outer end of shaft 22A through an angularly adjustable connection comprising a shear pin.

The secondary conveyor belt cleaner 20 further comprises a plurality of cantilever blade support arms 35A and 35B. These cantilever blade support arms are mounted at spaced longitudinal positions along the support member, sleeve 24, and all project from members 24 in a predetermined fixed orientation. A corresponding plurality of cleaner blades 36 are included in belt cleaner 20, each blade 36 being mounted on the outer (free) end of one of the cantilever arms. Cantilever arms 35A and 35B are all essentially identical in construction except that two different lengths are employed, alternately, as shown in FIGS. 1 and 2, so that the cleaner blades 36 are disposed in slightly overlapping alignment across the width of conveyor belt 21 (see FIG. 2) to assure thorough cleaning of all of the bottom belt surface. If preferred, all of the blade support arms may have the same overall length. In a secondary belt cleaner utilizing blade support arms of uniform length, the widths of blades 36 may be selected to allow a continuous, contiguous alignment of the blades across the conveyor belt width; see part C of FIG. 9 and its description.

As thus far described, conveyor belt cleaner 20 corresponds generally to the construction disclosed in the aforementioned Gordon U.S. Pat. No. 4,854,443. In operation, the torsion bias mechanism 30 biases shaft 22A, support sleeve 24, and shaft 22B toward rotation in the direction indicated by arrow X. As a consequence, the cleaning edges 37 of blades 36 are maintained in engagement with the bottom surface of conveyor belt 21, cleaning adherent material and debris from the belt surface. Both major and minor shocks affecting more than one blade are taken up, to at least some extent, by the torsion bias mechanism 30. The continuing bias afforded by mechanism 30 effectively compensates for gradual wear on the belt-engaging surfaces 37 of cleaner blades 36. The improvements represented by the present invention, as regards secondary belt cleaners, pertain primarily to the cantilever blade support arms, such as arms 35A and 35B, the mounting of blades 36 on the cantilever support arms, the mounting of the cantilever arms (e.g. 35A and 35B) on the transverse support 24, and the scraper blades 36 themselves, particularly their internal reinforcements.

FIGS. 3-7 illustrate in detail a preferred construction for scraper blades 36, their cantilever support arms such as the arms 35A and 35B, the blade reinforcements, the manner in which the scraper blades 36 are mounted on the cantilever arms, and the mounting of those arms on the elongated main support 24.

Each cantilever blade support arm, whether of the short length 35B or the longer length 35A, is preferably of forged, unitary metal construction, having the shape shown in FIGS. 3-6. Other metal working techniques may be used, though forging is the best procedure for making the cantilever arms. The preferred material for the cantilever blade support arms is aluminum and alloys of aluminum, for corrosion resistance, light weight and strength. More exotic materials might be utilized, but are likely to be unduly expensive. If a corrosion-prone metal is used for the cantilever arms (e.g., steel) the arms should be coated with a relatively thick layer of resin to protect them against corrosion.

The anchor end of each cantilever support arm 35, the end projecting from support 24, includes an open mounting slot 38 formed with two projections 88 and 89 (FIGS. 4 and 5) that fit into sockets 90 and 91, respectively, in an elongated resilient mounting block 41; see FIG. 1. The two projections 88 and 89 also fit tightly over a relatively rigid π-shaped guide member 39 molded int the resilient elastomeric resin mounting block 41 that extends the length of support 24. Keys 93 can be used to mount the resilient mounting block 41 on support 24; see FIGS. 1 and 2. Block 41 and the mounts 88-91 permit each arm 35 some limited movement relative to other blade support arms without introducing excessive movement as in some prior constructions. Guide member 39, usually metal, in turn fits firmly onto an inverted T-shaped guide mount 42 which may be formed by two angle members, as illustrated. Guide member 42 is welded or otherwise affixed to support sleeve 24 and thus forms an integral part of that support. Guide member 42 may be intermittent or continuous along support 24.

Figures 3, 4, 5, 6, 7, 8:
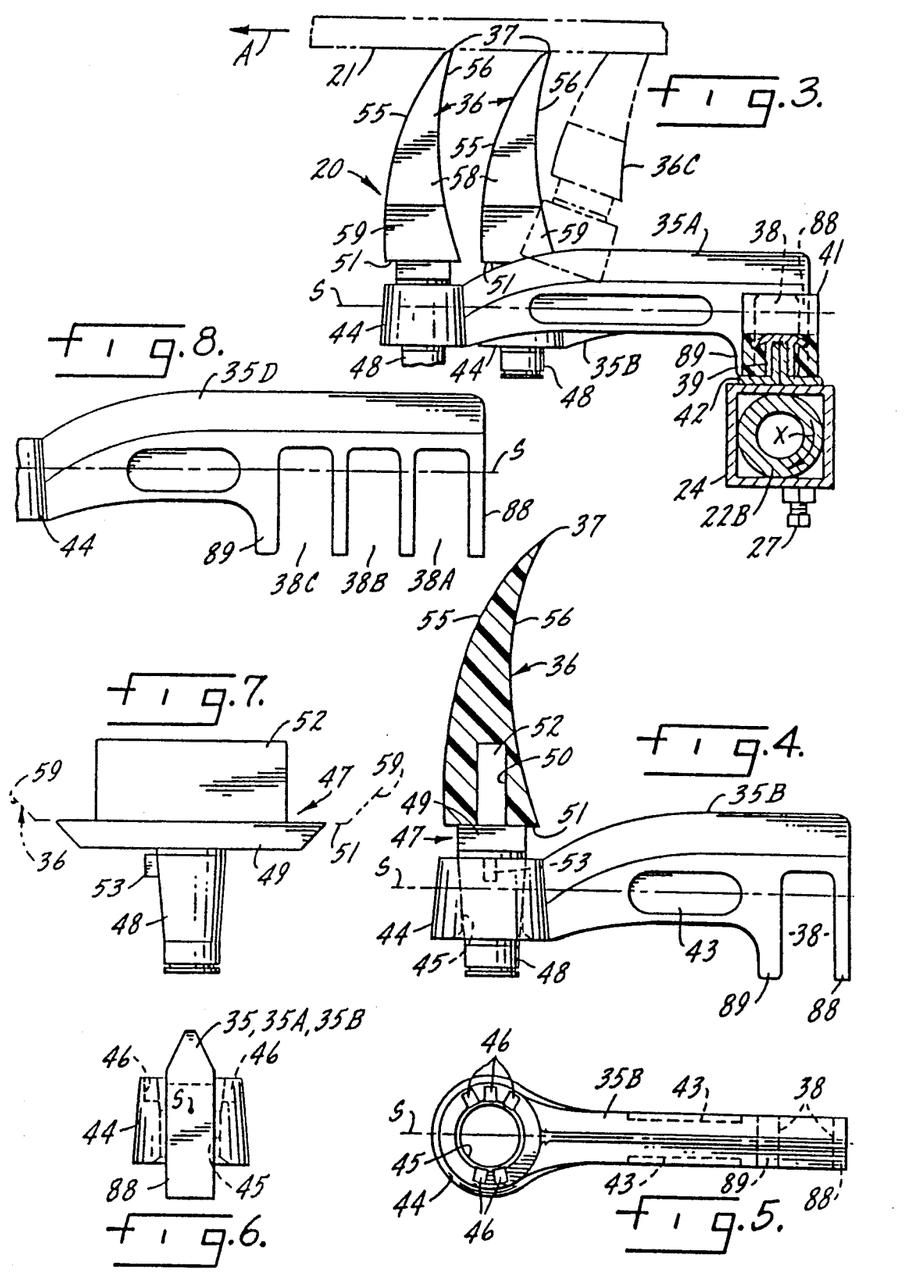
FIG. 3 is a side elevation view, partly in cross section, taken approximately as indicated by line 3—3 in FIG. 1.
FIG. 4 is a detail elevation view, partly in cross section, of one arm and blade of the belt cleaner of FIGS. 1-3.
FIG. 5 is a detail plan view of one blade support arm for the belt cleaner of FIGS. 1-3.
FIG. 6 is a detail end view of one blade support arm for the belt cleaner of FIGS. 1-3.
FIG. 7 is a detail elevation view of the metal portion of a blade unit for the belt cleaner of FIGS. 1-3.
FIG. 8 is a detail elevation view of a modification of the cantilever support arm for the secondary belt cleaners of FIGS. 1-7.

The configuration of a cantilever blade support arm 35B is shown in detail in FIGS. 4-6; the same construction applies to arm 35A except that arm 35A is longer than arm 35B. As previously noted, support arm 35B is longer than arm 35B. As previously noted, support arm 35B is preferably an aluminum forging. The inner, right-hand end of arm 35B, as seen in FIGS. 4 and 5, includes the slot 38 and projections 88, 89 for mounting the arm on block 41 on support sleeve 24. The central portion of arm 35B is of reduced thickness in areas 43 to minimize its weight. The outer or free end of arm 35B terminates in a socket 44 having a circular, tapered internal wall 45 that is somewhat larger at the top than at the bottom. Thus, the interior of socket 44 is of inverted frusto-conical configuration. A plurality of key receptacles 46 are formed in socket 44, facing upwardly, as shown particularly in FIGS. 5 and 6. The tapered, keyed construction used in the present invention minimizes blade vibration.

Each scraper blade 36 is mounted upon a support and reinforcement member 47; the construction of a typical blade mounting member 47 is best shown in FIGS. 4 and 7. Member 47 includes a plug portion 48, a base or support wall portion 49 on which the base wall 51 of a blade 36 rests, and a reinforcement portion 52 that projects upwardly into an elongated reinforcement-receiving groove or receptacle 50 in the base wall 51 of blade 36. Base wall 51 of blade 36 preferably is longer than support wall 49 in all directions, so that there is no ledge for material accumulation.

The plug portion 48 of member 47 is complementary to the socket 44 at the end of each blade support arm. Consequently, in the specific construction illustrated in FIGS. 4-7, the external configuration of plug 48 is circular in cross section but the wall tapers slightly, affording an inverted frusto-conical configuration that fits snugly into the internal wall 45 of socket 44. A key 53 projects outwardly from plug 48 and is engaged in one of the keyways 46 of socket 44 to align the blade 36 associated with member 47 at a predetermined angle with respect to the cantilever support arm for the blade. As previously noted, the tapered sockets and plugs, plus the keys and the keyways, reduce blade vibration and afford superior versatility for blade orientation.

In each blade 36, the base wall 51 is the shortest of the blade walls. The front and rear walls 55 and 56 of each blade are substantially longer than base wall 51. Furthermore, walls 55 and 56 are curved and joined at the edge 37 that engages the surface of belt 21 to be cleaned (FIG. 3). This makes the end walls 58 (FIGS. 2 and 3) generally triangular in configuration, but with curved sides. The lower portions 59 (FIG. 3) of the end walls 58 of each blade may be inclined inwardly adjacent base wall 51; see FIG. 2.

The secondary belt cleaner 20 shown in FIGS. 1-7 has two different sizes of cantilever blade support arms, the short arms 35B and the longer arms 35A. These are utilized to incorporate blades 36 in a staggered array, particularly shown in FIGS. 1 and 2, to assure full coverage of the surface of belt 21 that is to be cleaned. However, it is not essential to have two different arm sizes; a single arm 35D, as shown in FIG. 8, can be employed to produce two or even three or more cantilever arm lengths. This has the dual advantage of eliminating any need to stock two or more types of cantilever arm and increasing the flexibility of the possible blade arrangements, as discussed more fully hereinafter. Arm 35D, FIG. 8, utilizes the same construction as arms 35A and 35B but is provided with three different mounting slots 38A, 38B, and 38C. It is thus seen that arm 35D allows for mounting each blade 36 (FIG. 3) at any of three different distances from support sleeve 24.

Figure 9:
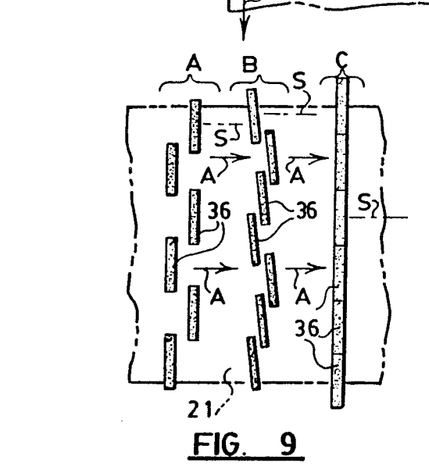
FIG. 9 is a schematic illustration of some different blade patterns for the invention.

FIG. 9 illustrates three of the various secondary scraper blade deployments that can be attained with the present invention. The arrangement shown in part A of FIG. 9 corresponds to the deployment of FIGS. 1-3. The part of FIG. 9 distribution can be realized with all of the blades 36 deployed in the sockets 44 of their support arms so that the blades are aligned at right angles to the axes S of those support arms. The cantilever arms may be of different lengths as in the case of arms 35A and 35B or the same arrangement can be obtained with uniform arms 35D as shown in FIG. 8, employing different mounting receptacles such as the receptacles 38A and 38C, or 38A and 38B, or even 38B and 38C.

Part B of FIG. 9 shows a different arrangement that requires three different lengths of cantilever support arms for the scraper blades 36. In each instance the blade 36 is aligned at a limited, acute angle relative to the axis S of its support arm. An angle of about 5° is shown; using multiple key receptacles 46 as shown in FIG. 5, a range of about 5° to 25° is readily obtainable. Substantial angles are often desirable to minimize the impact of belt splices; angle variations also afford better cleaning in some applications. This is realized quite easily with the keys 53 and keyways 46 of the preferred construction for the cantilever arms of the present invention, as described in connection with FIGS. 4-7. On the other hand, the arrangement shown in part B of FIG. 9 is most easily realized with support arms 35 of the kind shown in FIG. 8, since those cantilever support arms effectively provide for three different lengths and hence three different displacements from a given transverse support member 24 (FIGS. 1-3).

Yet another arrangement is shown in part C of FIG. 9. Here, the blades 36 are arranged end to end. The cantilever support arms for these blades can all be of the same construction and length and the blades are all oriented at 90° to the cantilever arm axes. Any of the cantilever arms can be used. It will be recognized that a substantial number of other, different patterns for the blades, extending across belt 21, can be readily obtained. Indeed, one scraper blade may span two or more cantilever arms, up to the full width L2; blades spanning two support arms are shown in the aforementioned Gordon U.S. Pat. No. 4,533,036. FIG. 9 shows all blades of uniform size, but different blade widths and varying blade angles may be used in one belt cleaner when desired.

Figure 10:
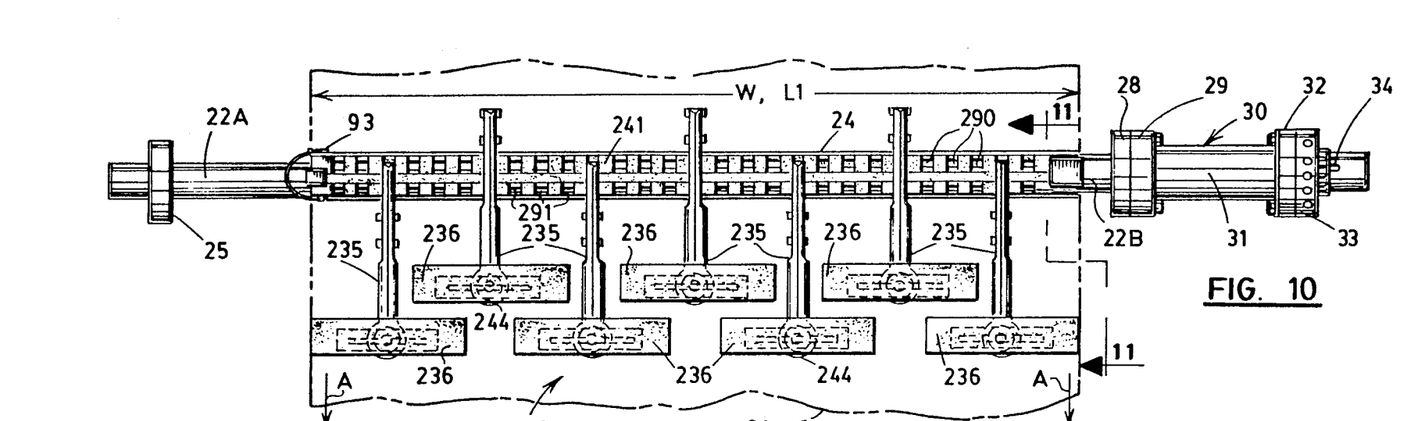
FIG. 10 is a plan view, like FIG. 1, of a secondary conveyor belt cleaner according to another embodiment of the invention.

FIG. 10 illustrates another secondary conveyor belt cleaner 220, again used for cleaning a conveyor belt 21 of width W that moves in the direction of arrows A. Belt cleaner 220, as before, comprises two shafts 22A and 22B aligned with each other and connected by an elongated support member 24. Support member 24 is a rigid metal sleeve that extends transversely of belt 21 in spaced relation to the lower surface of the belt, the belt surface to be cleaned. Support member 24, as before, has a length L1 approximately equal to the belt width W. One end of shaft 22A is journalled in a bearing 25; the other end of the shaft is affixed to support member 24 by appropriate means such as screws 26 (FIG. 2). Similar mounting screws 27 join the other end of support member 24 to shaft 22B.

The right-hand portion of shaft 22B, FIG. 10, extends through another bearing 28 connected to flange 29 on the torsion tube 31 of torsion bias mechanism 30. As before, a flange 32 on the other end of torsion tube 31 is connected to a collar 33 in turn connected to the outer end of shaft 22A through an angularly adjustable connection comprising shear pin 34.

Figures 11, 13, 14:
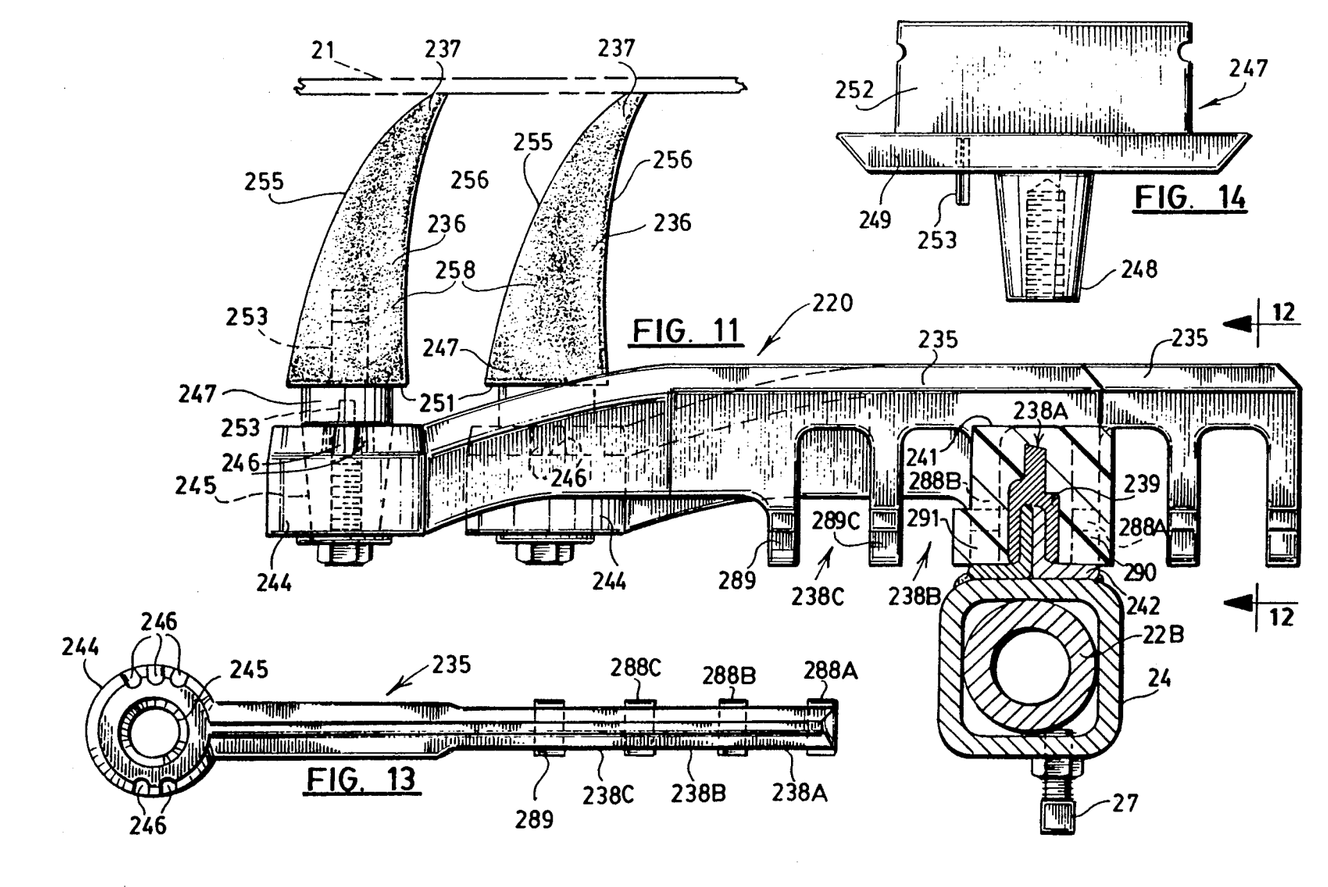
FIG. 11 is a partly cross-sectional side elevation view taken approximately along line 11—11 in FIG. 10.
FIG. 13 is a detail plan view of one blade support arm from the belt cleaner of FIGS. 10 and 11.
FIG. 14 is a detail elevation view of a metal blade reinforcement used in the belt cleaner of FIGS. 10 and 11.

Conveyor belt cleaner 220, FIG. 10, further comprises a plurality of cantilever blade support arms 235 mounted at spaced longitudinal positions along the support member, sleeve 24. Arms 235 all project from member 24 in a predetermined fixed orientation, preferably 90° to the axis of tube 24. There are a corresponding plurality of cleaner blades 236 in belt cleaner 220, each blade 236 being mounted on the outer end of one of the cantilever arms 235. Arms 235 are mounted on support 24 in alternate effective lengths, as shown in FIGS. 10 and 11, so that the cleaner blades 236 are disposed in slightly overlapping alignment across the width of conveyor belt 21 to assure thorough cleaning of all of the bottom belt surface. As in the belt cleaner 20, all of the blade support arms 235 of cleaner 220 could have the same effective overall length with blades 236 short enough to allow a continuous, contiguous alignment of the blades across the conveyor belt width as in alignment C in FIG. 9.

FIGS. 11-14 illustrate in detail a preferred construction for scraper blades 236, cantilever support arms such as 235 and their reinforcements, the mounting of the scraper blade 236 on the cantilever arms 235, and the mounting of arms 235 on the elongated main support 24.

Figure 12:
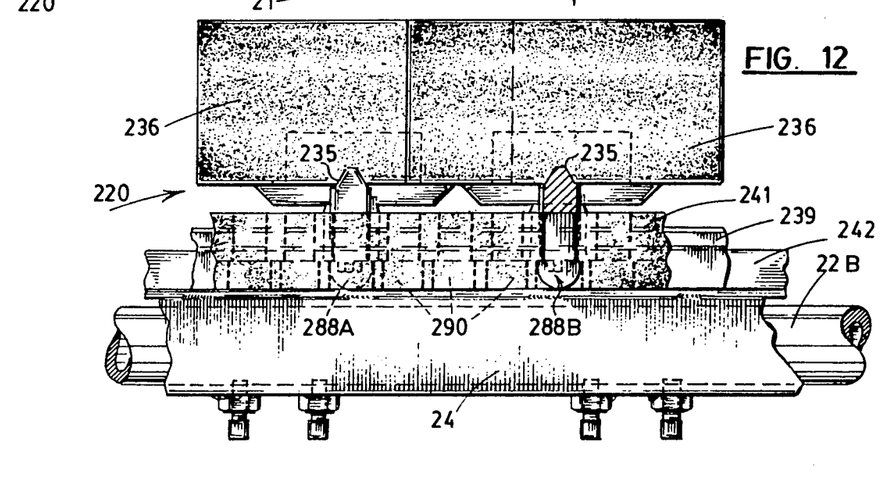
FIG. 12 is a detail view taken approximately as indicated by line 12—12 in FIG. 11.

Each cantilever blade support arm 235 is preferably of forged, unitary metal construction, having the shape shown in FIGS. 11-13. Other metal forming techniques (e.g., casting) may be used, but forging is usually the best. The preferred material for arms 235 is aluminum and alloys of aluminum, for corrosion resistance, strength, and light weight. More exotic materials are likely to be unduly expensive. As before, if a corrosion-prone metal is used for the cantilever arms 235 (e.g., steel) the arms should be coated with a relatively thick layer of resin.

The cantilever support arms 235 used in the secondary belt cleaner 220, FIG. 10, are all of the same configuration. At the fixed or anchor end of each arm 235 there are three mounting slots 238A, 238B and 238C formed by three similar downwardly extending projections 388A, 388B and 388C that all have the same shape and dimensions as shown in FIGS. 11-13. The forward mounting slot 238C is defined in part by a projection 289. All of the projections 288A, 288B, 288C and 289 are integral elements of one of the cantilever support arms 236; they allow mounting of each cantilever support arm at any one of three effective lengths, much like the construction shown in FIG. 8. The arrowhead-like shape of the lower end of each of the projections 288A, 288B, 288C and 289 is used for firmer mounting of arms 236 in the slots o sockets 290 and 291 of a resilient elastomeric mounting member 241 mounted on support member 24; see FIGS. 10 and 11. As before, keys 93 can be used to mount the resilient member 241 on support 24; see FIG. 10. As in the previous embodiment, block 41 and the described mounts permit each arm 235 some movement relative to the other blade support arms in cleaner 220 without introducing excessive movement. Guide member 239, FIG. 11, usually metal, fits firmly onto an inverted T-shaped guide mount 242 which may be formed by two angle members or as a unitary metal member. Guide member 242 again is welded or otherwise affixed to support sleeve 24 to form an integral part of that support. Guide member 242 may be intermittent or continuous along support 24.

The configuration of one cantilever blade support arm 235 is shown in detail in FIGS. 11-13; as previously noted, support arm 235 is preferably an aluminum forging. The fixed inner end of arm 235, the right hand end as seen in FIGS. 11 and 13, includes the slot 238 and projections 288, 289 for mounting arm 235 on block 241 on support sleeve 24. The central portion of arm 235 is of reduced thickness to minimize its weight. The outer or free end of arm 235 terminates in a socket 244 having a circular, tapered internal wall 245 that again is somewhat larger at the top than at the bottom. Thus, the interior of socket 244 is of inverted frusto-conical configuration. A plurality of key receptacles 246 are formed in socket 244; in this instance the keyways open upwardly and outwardly as shown particularly in FIG. 13. As before, this tapered, keyed construction minimizes blade vibration.

Each scraper blade 236 is mounted upon a support and reinforcement member 247 is best shown in FIG. 14. Member 247 includes a plug portion 248 having a base or support wall portion 249 on which the base wall 251 of blade 236 rests. As before, there is a reinforcement portion 252 that projects upwardly into a tight fit in an elongated reinforcement-receiving groove or receptacle 253 in the base wall 251 of blade 236. Blade base wall 251 is larger than support wall 249 so that there is no ledge for material accumulation. The plug portion 248 of member 247 is complementary to the socket 244 at the end of each blade support arm. Thus, the external configuration of plug 248 is circular in cross section but the wall tapers slightly, affording an inverted frusto-conical plug that fits snugly into wall 245 of socket 244. A key 253 projects down base 249 of reinforcement 247, FIG. 14, and is engaged in one of the keyways 246 around socket 244 to align the blade 236 associated with member 247 at a predetermined angle with respect to the cantilever support arm 236. As previously noted, the tapered sockets and plugs, plus the keys and the keyways, reduce blade vibration and afford superior versatility for blade orientation.

In each blade 236, the base wall 251 is the shortest of the blade walls. The front and rear walls 255 and 256 of each blade 236 are both substantially longer than base wall 251. Furthermore, walls 255 and 256 are curved and joined at the edge 237 that engage the surface of the belt to be cleaned. The lower portions of the end walls 258 of each blade 236 may be inclined inwardly adjacent base wall 251, as shown particularly in FIG. 14.

In all embodiments of the present invention, the illustrated shape of the scraper blades, with convex curved elongated walls tapering toward each other from a short base wall, provides longer wear than previously known constructions. With increasing wear, there is less tendency for the blade to bend or "give", a characteristic that increases blade longevity. The rigid construction for cantilever arms 35 and 235 in the secondary belt cleaners of the invention minimize vibration while at the same time allowing adequate compensation for belt joints and for accumulations of debris clinging to the belt that may affect individual secondary scraper blades. In these secondary scrapers, the metal (preferably steel) reinforcement 52 or 152 in the base of each blade 36 or 236 minimizes vibration without any undue tendency toward blade damage, particularly in view of the resilient mounting of each cantilever arm on transverse support 24 as provided by resilient blocks 41 and 241.

For blades 36 and 236, polyurethane is the preferred resin, though other resilient resins can be used. Polyurethane in a durometer range of 75 to 85 Shore D is preferred. The same material can be used for the resilient mounting blocks 41 and 241. For the rigid elements, metal is preferred, though rigid resin or laminate members could be employed in some instances. Although tapered plug and socket connections for mounting each metal reinforcement member 47 or 247 on an arm 35, 35A or 235 of the secondary belt cleaner are preferred, for reasons discussed above, parallel wall configurations can be used.

I claim:

1. A cantilever blade support arm for a secondary conveyor belt cleaner, for supporting a blade unit of the kind comprising a flexible blade of molded resin having, in cross section, a short base wall and two longer side walls extending away from opposite side of the base wall and converging at an elongated belt scraping edge, and a blade mounting member for mounting the blade on a cantilever blade support, the mounting member including one element of two complementary plug-and-socket connection elements, the cantilever blade support arm comprising:
an elongated, stiff, unitary support arm having an inner anchor end and an outer blade support end;
a plurality of mounting receptacles, each defined by two longitudinally displaced spaced projections at the inner end of the arm, the receptacles, being displaced longitudinally from each other along the arm, each for mounting the arm on a transverse support member in a secondary belt cleaner, so that the support arm has any one of a corresponding plurality of effective arm lengths; and
a plug-and-socket element at the outer end of the arm, complementary to the plug-and-socket element of the blade mounting member, for mounting the blade mounting member on the arm.

2. A cantilever blade support arm for a secondary conveyor belt cleaner according to claim 1 in which the blade support arm is an aluminum forging.

3. A cantilever blade support arm for a secondary conveyor belt cleaner according to claim 1 in which the plug-and-socket element at the outer end of the arm has a plurality of key elements for orienting the blade unit at any of a corresponding plurality of angular orientations to the arm.

4. A cantilever blade support arm for a secondary conveyor belt cleaner according to claim 3 in which the plug-and-socket element at the outer end of the arm is a socket and the key elements are keyways.

5. A cantilever blade support arm for a secondary conveyor belt cleaner, for supporting a blade unit of the kind comprising a flexible blade of molded resin having, in cross section, a short base wall and two longer side walls extending away from opposite sides of the base wall and converging at an elongated belt scraping edge, and a blade mounting member for mounting the blade on a cantilever blade support, the mounting member including one element of two complementary plug-and-socket connection elements, the cantilever blade support arm comprising:
an elongated, stiff, unitary support arm having an inner anchor end and an outer blade support end;
a mounting receptacle, defined by two longitudinally displaced spaced projections at the inner end of the arm, for mounting the arm on a transverse support member in a secondary belt cleaner; and
a plug-and-socket element at the outer end of the arm, complementary to the plug-and-socket element of the blade mounting member, for mounting the blade mounting member on the arm;
the plug-and-socket element at the outer end of the arm having a plurality of key elements for orienting the blade unit at any of a corresponding plurality of angular orientations to the arm.

6. A cantilever blade support arm for a secondary conveyor belt cleaner according to claim 5 in which the plug-and-socket element at the outer end of the arm is a socket and the key elements are keyways.

7. A blade and blade mount for a secondary conveyor belt cleaner comprising:
a flexible blade of molded elastomeric resin having, in cross section, a short base wall incorporating an elongated reinforcement-receiving receptacle and two longer side walls extending away from opposite sides of the base wall and converging at an elongated belt scraping edge;
and a blade mounting member for mounting the blade in a secondary belt cleaner, the mounting member including a stiff, elongated reinforcement tightly and removably seated in the reinforcement-receiving receptacle of the blade, a support wall projecting from the reinforcement and engaging the base wall of the blade when the reinforcement is seated in the receptacle;
the blade mounting member further including one element of complementary plug-and-socket connection elements for mounting the blade unit on the outer end of a cantilever support arm that constitutes the other plug-and-socket connection element.

8. A blade and blade mount for a secondary conveyor belt cleaner according to claim 7 in which the connection element of the blade mounting member is the plug element of the plug-and-socket connection and is of tapered configuration.

9. A blade and blade mount for a secondary conveyor belt cleaner according to claim 7 in which the plug-and-socket connection element further comprises a key to determine angular orientation of the blade unit relative to the cantilever support arm.

10. A blade and blade mount for a secondary conveyor belt cleaner according to claim 7 in which the blade mounting member is formed of metal.

11. A blade and blade mount for a secondary conveyor belt cleaner according to claim 10 in which the blade mounting member is a metal casting.

12. A blade and blade mount for a secondary conveyor belt cleaner according to claim 11 in which the connection element of the blade mounting member is the plug element of the plug-and-socket connection and is of tapered configuration, and in which the plug-and-socket connection element further comprises a key to determine angular orientation of the blade unit relative to the cantilever support arm.

13. A cantilever blade and blade support unit for a secondary conveyor belt cleaner according to claim 10 in which the blade mounting member is an aluminum forging.

14. A cantilever blade and blade support unit for a secondary conveyor belt cleaner, comprising:
a flexible blade of molded resin having, in cross section, a short base wall incorporating an elongated reinforcement-receiving receptacle and two longer side walls extending away from the base wall and converging at an elongated belt scraping edge;
a blade mounting member for mounting the blade in a secondary belt cleaner, the mounting member including a stiff, elongated reinforcement removably seated in the reinforcement-receiving receptacle of the blade, a support wall projecting laterally from the reinforcement and engaging the base wall of the blade when the reinforcement is inserted into the receptacle, and one element of two complementary plug-and-socket connection elements for mounting the blade unit on the outer end of a cantilever support arm;
and a cantilever blade support arm comprising an elongated, stiff, unitary support arm having an inner anchor end and an outer blade support end, at least one mounting receptacle at the inner end of the arm for mounting the arm on a transverse support member in a secondary conveyor belt cleaner, and a plug-and-socket element at the outer end of the arm, complementary to the plug-and-socket element of the blade mounting member, for mounting the blade mounting member on the outer end of the arm.

15. A cantilever blade and blade support unit for a secondary conveyor belt cleaner, according to claim 14 in which:
the side walls of the blade are curved, both concave in the same direction, the blade mounting member and the blade support arm are each formed of metal, and the plug-and-socket connection element on the outer end of the cantilever blade support arm is a socket.

16. A cantilever blade and blade support unit for a secondary conveyor belt cleaner according to claim 15, in which the blade support arm is a unitary metal forging having a plurality of mounting receptacles in the inner end of the arm, displaced longitudinally of the arm, so that the arm can be mounted on a transverse support member with any of a corresponding plurality of arm lengths.

17. A secondary conveyor belt cleaner comprising:
a stiff, elongated support member extending transversely of a conveyor belt of given width W, in spaced relation to the belt surface to be cleaned, the support member having a length L1;
guide means, comprising at least one guide member of predetermined cross-sectional configuration on the support member, the guide means extending for approximately the full length of the support member;
blade means, supported by the support member and engageable with the conveyor belt surface to be cleaned, the blade means including a plurality of flexible blades each having a short base wall incorporating a reinforcement-receiving receptacle and two longer side walls extending away from opposite sides of the base wall and converging at a belt scraping edge, the blade means having an overall length L2, with $L2 \approx L1 \approx W$;
blade mounting means for mounting the blade means in the belt cleaner with the belt scraping edge of each blade engaging the belt conveyor surface to be cleaned, the blade mounting means comprising a corresponding plurality of elongated, stiff, cantilever support arms, one for each blade, the inner portion of each arm being mounted on the guide means and the outer end of each arm supporting one blade of the blade means, the blade mounting means including a corresponding plurality of stiff reinforcements each fitting tightly and removably into the reinforcement receiving receptacle of its associated blade;
a portion of each blade mounting member and the outer portion of each cantilever arm being of complementary configuration, affording a plug on one portion interfitting into a socket on the other portion to mount a blade in predetermined orientation on the cantilever support arm;
and torsion bias means resiliently urging the support member toward rotation in a direction to maintain the belt scraping edges of the blades in engagement with the conveyor belt surface to be cleaned.

18. A secondary conveyor belt cleaner according to claim 17, in which:
each cantilever arm is a metal forging;
each blade mounting member is made of metal; and
the plug and socket portions have tapered, interfitting configurations.

19. A secondary conveyor belt cleaner according to claim 18, in which each cantilever arm and each blade member is formed of aluminum.

20. A secondary conveyor belt cleaner according to claim 17, in which each plug includes a key and each socket includes a plurality of keyways for receiving a key, so that each blade can be mounted on a cantilever arm at a plurality of different angular orientations.

21. A secondary conveyor belt cleaner according to claim 17, in which each plug and each socket are of complementary frusto-conical configuration.

22. A secondary conveyor belt cleaner according to claim 21, in which each plug includes a key and each socket includes a plurality of keyways for receiving a key, so that each blade can be mounted on a cantilever arm at a plurality of different angular orientations.

* * * * *